(12) United States Patent
Cottier et al.

(10) Patent No.: US 6,824,715 B2
(45) Date of Patent: Nov. 30, 2004

(54) METHOD AND APPARATUS FOR FORMING A LAMINATED SHEET MATERIAL BY SPATTERING

(75) Inventors: John Sydney Cottier, Oatley (AU); Greg Brunton, Castle Hill (AU); Robert Lyons, Alta Loma, CA (US)

(73) Assignee: James Hardie Research PTY Limited (AU)

( * ) Notice: Subject to any disclaimer, the term of this patent is extended or adjusted under 35 U.S.C. 154(b) by 441 days.

(21) Appl. No.: 10/090,388

(22) Filed: Mar. 4, 2002

(65) Prior Publication Data

US 2002/0179220 A1 Dec. 5, 2002

(30) Foreign Application Priority Data

| Mar. 2, 2001 | (AU) | PR3474 |
| Mar. 2, 2001 | (AU) | PR3475 |
| Mar. 2, 2001 | (AU) | PR3476 |
| Mar. 2, 2001 | (AU) | PR3477 |
| Mar. 2, 2001 | (AU) | PR3478 |

(51) Int. Cl.⁷ ............................................. D04H 1/20
(52) U.S. Cl. .................. 264/40.1; 264/40.7; 264/101; 264/112; 264/118; 264/122; 264/138; 264/308
(58) Field of Search ................ 264/40.1, 40.7, 264/101, 112, 118, 122, 138, 308

(56) References Cited

U.S. PATENT DOCUMENTS

| 2,987,408 A | 6/1961 | Minnick |
| 3,360,392 A | 12/1967 | Mod et al. |
| 3,873,025 A | 3/1975 | Qvarnstrom |
| 4,204,644 A | 5/1980 | Kozuka |
| 4,250,134 A | 2/1981 | Minnick |
| 4,256,504 A | 3/1981 | Dunstan, Jr. |
| 4,261,286 A | 4/1981 | Kupfer |
| 4,268,316 A | 5/1981 | Wills, Jr. |
| 4,403,006 A | 9/1983 | Bruce et al. |
| 4,411,723 A | 10/1983 | Takeuchi |
| 4,818,595 A | 4/1989 | Ellis |
| 4,915,740 A | 4/1990 | Sakai et al. |
| 4,981,740 A | 1/1991 | Larsen |
| 5,032,548 A | 7/1991 | Lowe |
| 5,073,197 A | 12/1991 | Majumdar et al. |
| 5,236,773 A | 8/1993 | Sorathia et al. |
| 5,294,255 A | 3/1994 | Smetana et al. |
| 5,314,119 A | 5/1994 | Watt |
| 5,383,521 A | 1/1995 | Onan et al. |
| 5,387,283 A | 2/1995 | Kirkpatrick et al. |
| 5,439,518 A | 8/1995 | Francis et al. |
| 5,484,480 A | 1/1996 | Styron |
| 5,490,889 A | 2/1996 | Kirkpatrick et al. |
| 5,536,310 A | 7/1996 | Brook et al. |
| 5,556,458 A | 9/1996 | Brook et al. |
| 5,693,137 A | 12/1997 | Styron |
| 5,853,475 A | 12/1998 | Liskowitz et al. |
| 5,997,632 A | 12/1999 | Styron |
| 6,332,921 B1 | 12/2001 | Brothers et al. |
| 6,346,146 B1 | 2/2002 | Duselis et al. |
| 6,692,570 B2 * | 2/2004 | Cottier et al. ............... 118/300 |

FOREIGN PATENT DOCUMENTS

| JP | 60135211 | 7/1985 |
| JP | 9201561 | 8/1997 |

* cited by examiner

*Primary Examiner*—Stephen J. Lechert, Jr.
(74) *Attorney, Agent, or Firm*—Knobbe, Martens, Olson & Bear, LLP

(57) ABSTRACT

A method for forming a laminated sheet material from a slurry having a liquid component. The method comprising the steps of:
- applying the slurry to a substrate in successive layers to form a wet sheet of predetermined thickness;
- applying at least one of the layers by spattering;
- removing the wet sheet from the substrate; and
- drying or curing the wet sheet so as to remove at least a substantial proportion of the liquid component and thereby forming the sheet material.

36 Claims, 6 Drawing Sheets

METHOD AND APPARATUS FOR FORMING A LAMINATED SHEET MATERIAL BY SPATTERING

FIELD OF THE INVENTION

This application claims priority from the following Australian provisional patent applications, the full contents of which are hereby incorporated by cross-reference.

| Application No. | Title | Date Filed |
| --- | --- | --- |
| PR3474 | A Composite Product | 02 Mar. 2001 |
| PR3475 | Spattering Apparatus | 02 Mar. 2001 |
| PR3476 | Additive For Dewaterable Slurry | 02 Mar. 2001 |
| PR3477 | A Method And Apparatus For Forming A Laminated Sheet Material By A Spattering | 02 Mar. 2001 |
| PR3478 | Coatings For Building Products | 02 Mar. 2001 |

The present invention relates to a method and apparatus for forming a sheet material, and in the preferred form, a laminated sheet material.

The invention has been developed primarily for use in the formation of fibre reinforced cement ("FRC") sheeting, from cementitious slurry through a modification to the "Hatschek" process, for use in the building industry. It will therefore be described primarily with reference to this application. It should be appreciated, however, that the invention is not limited to this particular field of use, being potentially applicable to other materials, other manufacturing processes, and other industries.

BACKGROUND OF THE INVENTION

The following discussion of the prior art is intended to present the invention in an appropriate technical context and allow the significance of it to be properly appreciated. Unless clearly indicated to the contrary, however, reference to any prior art in this specification should not be construed as an admission that such art is widely known or forms part of common general knowledge in the field. Sheet material, and in particular FRC sheet material, is widely used in the building and construction industries in a variety of applications including cladding, lining, framing, flooring, roofing, dooring, window framing, insulating, waterproofing, decorative trimming and the like. Depending on how the material is used in different situations, advantage is taken of its unique structural, aesthetic, acoustic, thermal, and weather resistant properties. It is typically manufactured in different sizes, shapes, thicknesses, densities and with various special purpose additives, in conjunction with other materials, so as to take optimal advantage of its functional characteristics in different applications.

FRC sheet was initially manufactured using modified paper making machinery, from cementitious slurries incorporating fibrous asbestos for reinforcement. Later, fibrillated cellulose fibre was substituted as an alternative to asbestos, and the manufacturing equipment was progressively developed more specifically to the FRC industry.

As a culmination of this development work, one of the most common manufacturing processes currently used in the industry is now known as the "Hatschek" process. In this process, a cementitious slurry is initially formed from water, cellulose fibre, silica, cement and other additives selected to impart particular properties to the product according to its intended application. The slurry is mixed in an agitator and delivered to a feed sump from where it is pumped through a series of vats. A sieve cylinder is immersed in the slurry within each vat and these cylinders rotate as they are progressively driven by the bottom run of an overlying belt, formed from a specially formulated felt material. A typical Hatschek machine in a large scale production environment will incorporate a series of three or four vats, and a corresponding number of associated sieve cylinders. The number of vats and cylinders may vary, however, and there need not be a one to one correlation between them in the sense that several cylinders could be immersed in a single vat.

In the process, the relatively dilute slurry in the vats filters through wire mesh screens fitted to the respective sieve cylinders. As the slurry filters through this mesh, it deposits a layer of cellulose fibre on the underside surface of the wire, which acts as a filter medium to trap the other particulate materials in the feed slurry. By this mechanism, a thin film of material having a thickness of around 0.3 mm is quickly built up on the surface of the sieve. This process thickens the slurry from a concentration of around 7% solids in each vat to a concentration of around 70% solids in the film. The excess water passes through the sieve wire as filtrate and exits from the end of the sieve cylinder, so that the residual solids may be recovered and recirculated.

The film formed on the surface of each sieve cylinder is transferred upon contact to the outer surface of the overlying belt. This transfer process takes place by virtue of the fact that the felt is less porous than the sieve, as a consequence of which atmospheric pressure facilitates the transfer.

As the felt passes over each successive vat in the series it picks up a corresponding series of sequential layers of film from the associated sieves and thereafter passes over a vacuum box positioned along the top run of the belt where the accumulated layers of film on the belt have their moisture content reduced.

The layered film then passes between a tread roller, which also provides the driving force to the belt, and an adjacent accumulation or "size" roller in the form of a relatively large diameter drum. The tread and size rollers are positioned such that further water is pressed out of the film while it is transferred to the size roller by a mechanism similar to that by which it was previously transferred from the sieve cylinders to the belt. The size roller accumulates a number of layered films according to the number of turns allowed before the film is cut off. Thus, the formation of a thicker sheet is achieved by allowing a larger number of turns before cutting the film. In the cut off process, a wire or blade is ejected radially outwardly from the surface of the size roller to cut longitudinally the cylinder of layered film material that has cumulatively formed on the surface of the roller.

Once cut, the sheet of material peels off the size roller to be removed by a run-off conveyor. The material at this stage has the approximate consistency of wet cardboard, and therefore readily assumes a flat configuration on the run-off conveyor. To complete the process at the wet end, the felt is cleaned as it passes through an array of showers and vacuum boxes, before returning to the vats to pick up fresh layers of film. It will be appreciated that the quality and characteristics of sheet material produced from the Hatschek process are dependent upon a wide range of variables associated with the slurry formulation and the various settings at the wet end of the machine.

Further down the process line, the "green" sheet is roughly trimmed to size at a green trim station using high pressure water jet cutters, after which it proceeds as individual sheets to a stacker. At the stacker, the green sheets are picked up by vacuum pads and formed with interleaving sheets into autoclave packs.

After partial curing, and optionally a further compression process to increase density, the sheets are loaded into an autoclave unit for final curing under elevated temperature and pressure conditions. In the autoclave, a chemical reaction occurs between the raw materials to form a calcium silicate matrix which is bonded to the cellulose reinforcing fibre. This process takes around 12 hours and at its completion, the sheets emerge fully cured, ready for accurate final trimming, finishing and packing.

One of the major limitations with the Hatschek process, and other known processes for the manufacture of FRC sheet, is that because of the way in which the layers of film are progressively formed from a cementitious slurry, and because the composition of the slurry itself is critical to the formation process, it is difficult to form sheet material accurately in multiple discrete layers having substantially different material compositions. This is desirable for a number of reasons, primarily to permit a greater degree of flexibility in tailoring the structural, aesthetic and other properties of the material, so as to optimise its performance characteristics in particular applications. For example, it may be desirable to incorporate layers of fire retardant materials, textured outer layers to achieve particular aesthetic effects, softer outer layers to facilitate sanding and finishing, coloured outer layers to obviate the need for painting, or layers to modify water resistance, strength, impact resistance, thermal insulation, acoustic insulation, or other properties. In this context, various attempts have been made to introduce supplementary layers into the sheet at selected stages as it is progressively formed. To date, however, these attempts have not been successful, or at best have been only partially effective. One of the difficulties, which has not hitherto been overcome, relates to the desirability of being able to position layers of different material composition accurately at predetermined levels in the sheet. This difficulty arises partly because of the manner in which the sheet is progressively developed, partly because of the difficulty in altering the material composition or concentration within the vats during the production process, and partly because of the difficulty involved in accurately stopping and starting any sort of supplementary injection or infusion process at high speed, in synchronisation with the rest of the process.

Within the relatively rigid constraints of the existing process, it is possible uniformly to vary the overall composition of the sheet material to some extent, by using different slurry formulations in order to enhance particular selected characteristics. However, by not accommodating multiple layers of different composition, the result is often compromised in some respect either in terms of performance or cost. For example, it may be desirable to form a relatively soft outer layer on the sheet material, to facilitate sanding and finishing, whereas a sheet formed entirely from a softer formulation may be highly compromised in terms of structural integrity. Similarly, it may be that a relatively thin fire retardant layer is sufficient to substantially increase the fire rating of the sheet, whereas a sheet formed entirely from a fire retardant formulation may be prohibitively expensive.

It is possible to form a laminated product by combining one or more different layers after final curing of the FRC sheet, for example by gluing multiple sheets of different formulations together. However, this then adds significantly to the time and cost of production, and gives rise to further problems in terms of the need for development of special purpose adhesives, and the potential for warping, delamination, and the like.

In order to overcome these problems, attempts have been made to apply additional layers of slurry by incorporating supplementary application devices into the Hatschek process such that the respective layers can be integrated during the wet phase of that process. In this context, various forms of apparatus for applying liquids to substrates are known. For example, one process makes use of a spray bar whereby a liquid coating, such as a paint or primer, is squirted and atomised through spaced apart nozzles, so as to coat the substrate which typically passes progressively beneath the spray bar on a conveyor. One problem with devices of this type is that the relatively fine nozzles required to achieve the degree of atomisation necessary for uniform coating are readily clogged, particularly in the case of slurries containing a solid component in suspension. This results in inconsistent application, and requires frequent cleaning which is time consuming, costly and disruptive to the production process. Atomisation is also problematic in the case of more viscous liquids and slurries.

Another known device is a curtain coater, which makes use of a sheet or curtain of flexible fabric material which drapes over the moving substrate and applies a coating by means of a direct wiping action. However, curtain coaters are prone to inconsistent application, are not well suited for use with slurries, are limited in terms of the speed at which they can operate effectively in a production environment, and are not well adapted to applying relatively thick coatings.

Another known form of applicator is usually referred to as a flood coater, which essentially operates by forming a pool of liquid on the substrate, and spreading the pool over the surface with air jets. Again, however, there are limitations with this technique in terms of the uniformity of application, the viscosity of the liquid or slurry that can be used, and the thickness of the layer or coating that can be applied.

Generally, therefore, these known forms of apparatus are subject to a variety of limitations including susceptibility to clogging, inconsistent application, limitations in speed, limitations in the width of sheet material that the coating can be applied to, limitations in the consistency of the liquid or slurry that can be applied, or some combination of one or more of these shortcomings. They are also typically adapted to apply relatively thin outer surface coatings, as distinct from intermediate layers of substantial thickness as part of a laminated sheet. These limitations render such prior art devices generally unsuitable for use in the manufacture of sheet materials, and particularly FRC sheets, of substantial size and at relatively high speed.

Another known form of apparatus is a spatter coater, which makes use of a rotating roller incorporating a radial array of flexible filaments or bristles to spatter a coating onto a substrate. Spatter coaters are used, for example, to apply surface coatings to clay or masonry tiles, on a production line. Spatter coaters are able to some extent to overcome some of the deficiencies of the other known forms of coating apparatus, especially in terms of clogging. However, in the context of the production of sheet material, known spatter coaters are also subject to inherent limitations.

In particular, known spatter coaters are not able accurately to stop and restart the application process on an intermittent basis, in order to permit precisely controlled coating or laminating. This is especially so with the types of slurries typically used in the production of FRC sheet, because of the relatively runny consistency required to ensure "self-levelling", and the consequential tendency for excess slurry to drip onto the substrate, even if the slurry supply is shut off or the spattering roller is temporarily stopped.

This precise control over intermittent stopping and starting of the application process is particularly important in a high speed production environment where different batches of sheets, having different layers, thicknesses or properties, may be required to run back to back through the coating apparatus and inaccurate transitional control can result in patchy application, or the coating for one batch running over into the following batch of product.

A further difficulty arises due to the fact that, in the manufacture of FRC sheet or other products using cementitious slurries, it is desirable not to stop the supply of slurry to the apparatus itself, as this can result in the stagnation or accumulation of slurry in the apparatus or in upstream parts of the process. This, in turn, can result in overflows, changes in slurry consistency or concentration, settling or sedimentation, or undesirable variations in other process parameters.

Known spattering apparatus do not provide for the precise interruption of the slurry application process, and also do not allow for interruption without stopping the supply of slurry to the apparatus. They are therefore not effective in enabling an accurately controlled intermittent application process, especially in a high speed production environment for sheet materials.

The foregoing description of the prior art is provided so that the present invention may be more fully understood and appreciated in its technical context and its significance more fully appreciated. Unless clearly indicated to the contrary, however, this discussion is not, and should not be interpreted as, an express or implied admission that any of the prior art referred to is widely known or forms part of common general knowledge in the field.

It is an object of the present invention to overcome or substantially ameliorate one or more of the limitations of the prior art, or at least to provide a useful alternative.

SUMMARY OF THE INVENTION

Accordingly, in a first aspect, the invention provides a method for forming a laminated sheet material from a slurry having a liquid component, said method comprising the steps of:

applying the slurry to a substrate in successive layers to form a wet sheet of predetermined thickness;

applying at least one of the layers by spattering;

removing the wet sheet from the substrate; and drying or curing the wet sheet so as to remove at least a substantial proportion of the liquid component and thereby forming the sheet material.

The terms "spatter", "spattering" and the like as used herein, are intended to encompass any application technique whereby the slurry is deposited onto a surface or substrate in droplet, globule, particulate or atomised form, whether produced by brushing, flicking, rotating, spraying, agitating, atomising or other dispersion means, and whether propelled by mechanical, electrostatic, hydrostatic, hydrodynamic, gravitational or other means.

Unless the context clearly requires otherwise, throughout the description and the claims, the words 'comprise', 'comprising', and the like are to be construed in an inclusive sense as opposed to an exclusive or exhaustive sense; that is to say, in the sense of "including, but not limited to".

Preferably, the slurry is a cementitious slurry, formed from a mixture of water, cellulose fibre, silica, cement and optionally other additives, in predetermined proportion according to the desired properties of the sheet material.

Preferably, the method incorporates the "Hatschek" process, or a derivative or variation thereof, wherein the substrate takes the form of a porous belt, and the method includes the further steps of:

progressively accumulating the film on a size roller downstream of the belt until a predetermined thickness has been achieved; and cutting and removing the accumulated material from the size roller to form the wet sheet.

Preferably, the porous belt is formed from felt, and the film is deposited at least partially on the belt using a series of sieve cylinders in rolling contact with the belt and substantially immersed in vats containing the slurry.

In the preferred embodiment, the spattered layer is formed from a material composition that is substantially different to at least one other layer in the sheet, the composition and position of the spattered layer being selected to confer or optimise predetermined physical properties or performance characteristics in the sheet. The desired properties or characteristics may include, but are not limited to enhanced water resistance, fire retardance, tensile or compressive strength, toughness, crack resistance, impact resistance, hardness, density, thickness, thermal insulation, acoustic insulation, nailability, workability, colour or surface texture.

In a preferred embodiment, the spattered slurry is a cementitious slurry and more preferably, is formed from a mixture of silica, cement, water and optionally other additives. Most preferably, the slurry is a self levelling dewaterable cementitious slurry with a solids content of between 50% and around 90%. The slurry preferably includes a dewatering aid in a sufficient quantity to permit dewatering of the slurry, preferably through the substrate with or without vacuum assistance.

Preferably, the spattered layer is applied using an apparatus for applying a slurry to a substrate, the apparatus including:

a delivery surface disposed to support a layer of slurry;

spattering means adapted to be positioned closely adjacent the delivery surface and being moveable so as to spatter the slurry from the delivery surface onto the substrate; and regulation means for selectively varying or interrupting the flow of slurry from the delivery surface onto the substrate.

In the preferred application of the invention, the substrate will either be the porous belt, or a previously deposited film or layer of the cementitious slurry.

Preferably, the apparatus includes a reservoir to contain slurry upstream of the regulation means. Preferably, the reservoir includes an inlet to direct slurry from a supply source, and an outlet associated with the regulation means.

Preferably, the reservoir includes an inlet to direct the slurry from a supply source and an outlet associated with the regulation means. The regulation means preferably include a pair of barrier elements selectively moveable to define an intermediate clearance space of variable effective cross sectional flow area, thereby to permit selective regulation of the flow rate of the slurry between the barrier elements. Preferably, the barrier elements are adapted in a closed configuration to selectively shut off the flow of slurry between the reservoir and the delivery surface.

Preferably, one of the barrier elements is a first cylindrical roller rotatable about a first axis. The other of the barrier elements is preferably a second cylindrical roller rotatable about a second axis, substantially parallel to the first. The rollers are preferably configured to rotate in opposite directions.

The first roller preferably takes the form of a delivery drum, the outer surface of which constitutes the delivery surface. The second roller preferably takes the form of a metering roller, selectively moveable toward and away from the delivery drum, so as to permit selective variation or interruption of the spattering process, as part of the regulation means.

In one embodiment, the reservoir is at least partially defined by a tank positioned immediately above the delivery and metering rollers. In an alternative embodiment, the reservoir is simply a containment region defined between adjacent rollers, preferably the delivery roller and an abutting idler roller, with the metering roller being positioned above the delivery roller.

The apparatus preferably further includes a main frame supporting the delivery drum, and a first sub-frame on which the metering roller is mounted. The first sub-frame is preferably rotatable about a third axis, substantially parallel to and spaced apart from the second axis, whereby rotation of the first sub-frame about the third axis adjustably displaces the metering roller towards and away from the delivery roller.

In one preferred embodiment, the apparatus includes hydraulic or pneumatic actuation means for adjustably moving the metering roller and the delivery drum toward and away from each other.

Preferably, the spattering means include a generally cylindrical body rotatable about a fourth axis, generally parallel to the other axes, and a plurality of resiliently flexible elongate spattering elements extending radially outwardly from the body. The body and spattering elements together preferably form a spattering roller.

The apparatus preferably includes a second sub-frame on which the spattering roller is mounted, the second sub-frame being rotatable about a fifth axis, generally parallel to and spaced apart from the fourth axis, to permit adjustable displacement of the spattering roller toward and away from the delivery drum.

Preferably, the spacing between the various rollers, as well as the speed of the rollers, are selectively adjustable to permit regulation of the spattering rate according to the speed of the production process, the desired thickness of the spattered layer, the consistency of the spattered slurry, and other relevant parameters.

In one particularly preferred embodiment of the invention, the method incorporates a series of spattering apparatus disposed to operate on the same Hatschek machine, with vacuum boxes optionally being positioned after each spattering apparatus to facilitate dewatering through the sheet. In this arrangement, each spattering apparatus may be configured to deliver slurry formulations having either identical or different compositions, corresponding to desired aesthetic, functional or performance characteristics in the finished sheet. It will be appreciated that the array of spattering apparatus may be controlled to deliver single or multiple layers between successive fibre cement laminates.

Although the invention has described with reference to specific examples, it will be appreciated by those skilled in the art that the invention may be embodied in many other forms.

BRIEF DESCRIPTION OF THE DRAWINGS

A preferred embodiment of the invention will now be described, by way of example only, with reference to the accompanying drawings in which.

PREFERRED EMBODIMENTS OF THE INVENTION

Figure 1:
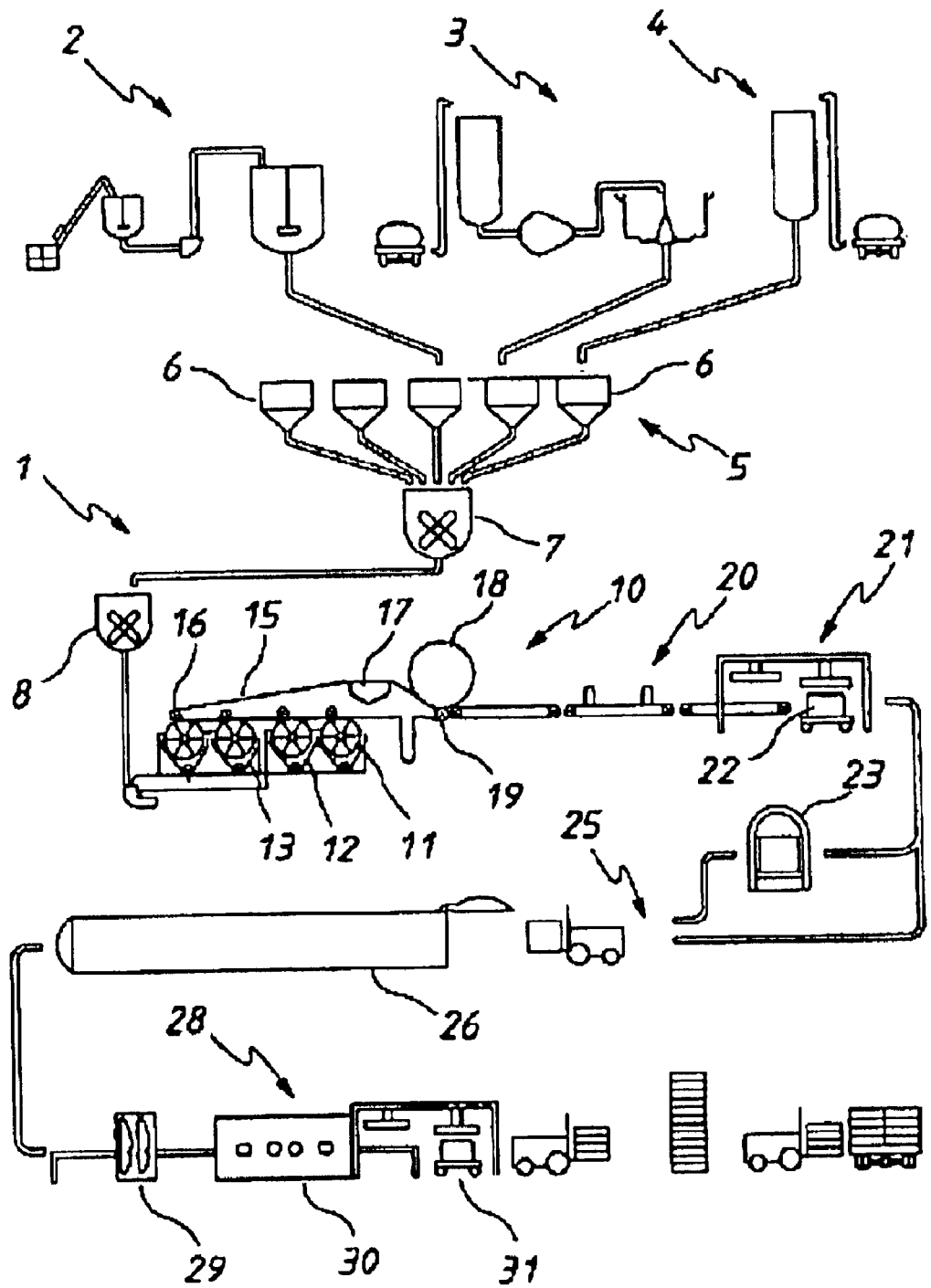
FIG. 1 is a flow chart illustrating diagrammatically the currently known process for production of FRC sheet, using a Hatschek machine.

Referring to the drawings, the invention in its preferred embodiment is adapted for incorporation into a process plant for the production of FRC sheet. Referring initially to FIG. 1, the production line 1 incorporates at the front end a cellulose plant 2 in which cellulose fibre is received as bales of pulp, refined and stored. In a silica plant 3, silica is received as raw sand, ground to size in a ball mill and thickened. In a cement plant 4, cement is received and stored in a silo, without further treatment. Raw material from the cellulose plant 2, silica plant 3 and cement plant 4 are directed to a mixing plant 5, in which all of the raw materials, including any special additives, are accurately weighed in weigh hoppers 6, mixed with water in a mixer 7, and conveyed to an agitator 8 as feed slurry.

From the agitator, the feed slurry goes to the wet end of a Hatschek machine 10 (see FIG. 2) where it is filtered by a series of four sieve cylinders 11 rotating in respective vats 12 incorporating beaters 13 to prevent settling. Concentrated slurry is thereby transferred onto the outer surface of the lower run of a felt belt 15 as a layered film 16. After dewatering over a vacuum box 17, the film is squeezed in the nip between a size or accumulation roller 18 and a tread roll 19 for further dewatering, before being progressively wrapped onto the size roller 18 for a preset number of revolutions whereby successive layers of film accumulate in corresponding layers on the roller to a predetermined thickness. The film is then cut off by a longitudinal knife (not shown) which upon actuation extends radially outwardly from the outer surface of the accumulation roller, and flattened to form a sheet with the approximate consistency of wet cardboard.

From there, the sheet is conveyed to a green trimming station 20 and cut to size using high pressure water jet cutters (not shown). The trim offcuts are pulped in a scrap pulping plant (also not shown) for reuse. The sheets then proceed to a stacking station 21, wherein they are picked up by vacuum pads and incorporated together with precured interleave sheets into autoclave packs 22. The packs 22 are then transferred, optionally via a further press 23 to enhance density, to a holding station 25 for partial curing.

The partially cured sheets are loaded into a high pressure steam autoclave unit 26 for final curing under a pressure of approximately 900 kpa, which gives a temperature in the stack of around 180° C. Under these conditions in the autoclave, a chemical reaction occurs between the raw materials to form a calcium silicate matrix bonded to the cellulose reinforcing fibres. This process takes about 12 hours and upon completion, the sheets emerge fully cured.

Following the autoclave cure, the sheets proceed to the finishing plant 28, incorporating a sanding station 29 and a trimming station 30, in which the sheets are accurately trimmed to length and width and in the case of some products, the surface of the sheets may be sanded and a sealer applied. At the end of the finishing process, the sheets are packed in a stacking station 31, ready for storage and delivery. To this extent, the basic production process is known and understood by those skilled in the art, and so need not be described in more detail.

Figure 2:
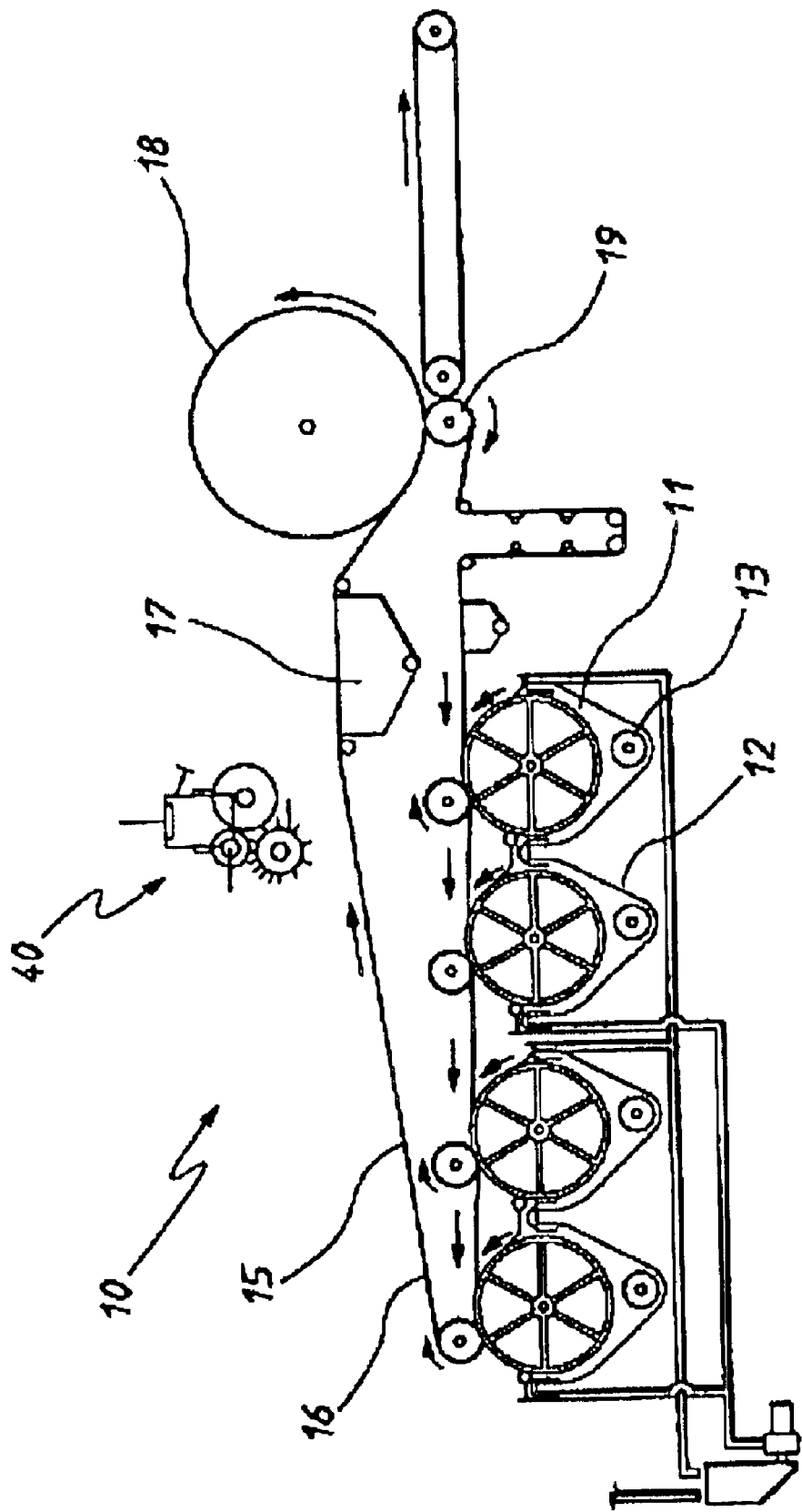
FIG. 2 is an enlarged view showing the wet end of the Hatschek machine of FIG. 1, modified by the incorporation of a spattering method and apparatus, in accordance with the present invention.
Figure 3:
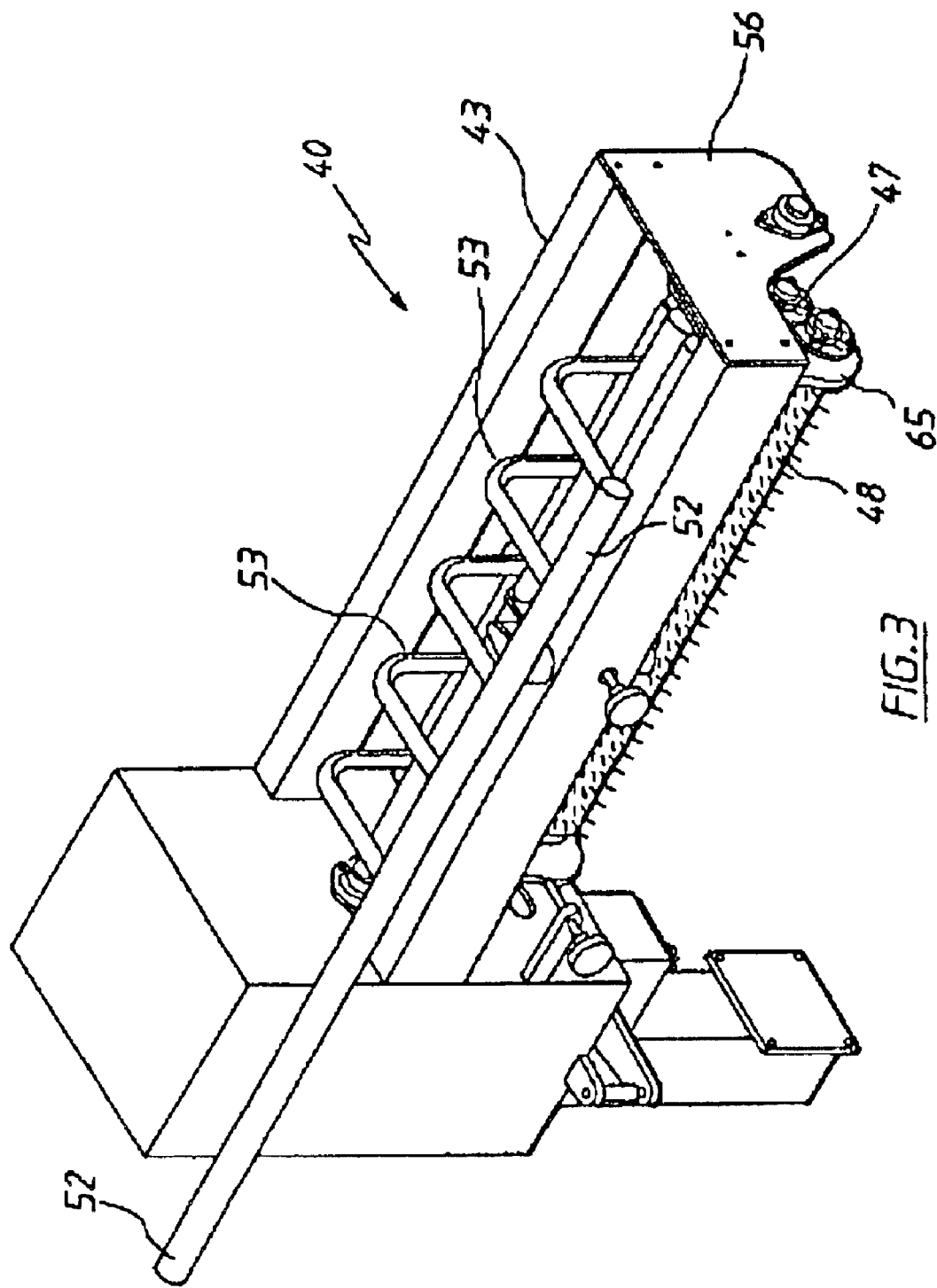
FIG. 3 is an enlarged perspective view showing the spattering apparatus of FIG. 2 in more detail.

FIG. 2 is an enlarged view of the Hatschek machine 10, as modified by the incorporation of a spattering apparatus 40 (shown diagrammatically in FIG. 2), in accordance with the present invention. Within the broad context of FIG. 2, the spattering apparatus itself is illustrated in more detail in FIGS. 3 to 5. Referring to these drawings, the spattering apparatus 40 comprises a an elongate reservoir 43 for containing the slurry to be spattered, and a delivery drum 44 having an outer delivery surface 45 to receive and support by surface tension a layer or film of the slurry from the reservoir. The apparatus further includes regulating means 46 comprising a cylindrical metering roller 47 for selectively regulating the flow rate of slurry from the reservoir to the delivery surface on the delivery drum, and a spattering roller 48 adapted to spatter the slurry from the delivery surface onto the substrate. In this case, the substrate will comprise either the felt belt 15 of the Hatschek machine, or else preliminary layers or films of slurry previously deposited onto the belt by the Hatschek process.

At the top of the reservoir 43, a number of inlets 49 receive slurry from a supply source in the form of a five hundred litre slurry holding tank 50 (see FIG. 5) positioned below the level of the apparatus. The slurry is delivered by a pump (not shown) to the reservoir from the holding tank via a manifold 51. The manifold includes a header pipe 52 in fluid communication with the tank, and a number of parallel delivery pipes 53 extending downwardly from the header pipe. The delivery pipes 53 open through the inlets 49, into the reservoir, to deliver the slurry as indicated by arrows A in FIG. 5. An overflow pipe 54 extends between the reservoir and the holding tank, such that when slurry in the reservoir exceeds a predetermined level, it is recycled back to the holding tank, as indicated by arrow B, to prevent overflow of the reservoir.

The delivery drum 44 is essentially a cylindrical roller and is mounted for rotation, in a direction indicated by arrow C, about a first axis 55 on the main frame 56 of the apparatus. The drum is disposed below the outlet 57 of the reservoir and is thereby positioned in the path of slurry feeding downwardly from the reservoir, as indicated by arrow D, such that the reservoir feeds directly onto the delivery surface 45.

In this way, the delivery drum forms part of the regulation means 46 and operates in conjunction with the metering roller 47, which is mounted on a first sub-frame 58 (see FIG. 4) for rotation in a direction indicated by arrow E, about a second axis 59 which is generally parallel to the first axis 55. The sub-frame 58, in turn, is mounted on the main frame 56 for rotation about a third axis 60, parallel to the second axis 59.

Actuation means in the form of a pneumatic or hydraulic ram 61 are disposed progressively and selectively to rotate the sub-frame 58, to effect movement of the metering roller 47 toward or away from the delivery drum, as indicated by arrow F. It will thus be appreciated that the delivery drum and the metering roller function as a pair of barrier elements defining an intermediate clearance space 62 therebetween, for regulating the flow of slurry from the reservoir to the delivery surface. This movement may alternatively be effected by a screw threaded adjuster, or some other suitable adjustment mechanism.

The delivery drum and metering roller are driven in opposite directions, via a motor, gear box and chain drive assembly (not shown). Both the delivery drum and the metering roller are plated with chrome to provide the desired surface hardness. In other embodiments, however, the delivery drum and metering roller may be coated polyurethane, carbide, or other materials as appropriate.

The spattering roller 48 includes a cylindrical body 63 and a plurality of resiliently flexible elongate spattering elements in the form of bristles 64, which extend radially outwardly from the body. The spattering roller is mounted on a second sub-frame 65 for rotation about a fourth axis 66, generally parallel to the first axis 55. The sub-frame 65, in turn, is mounted on the main frame 56 for rotation about a fifth axis 67, generally parallel to the other axes. A ram 68 or other suitable actuator is provided for rotating the second sub-frame 65 about its axis 67, and hence for moving the spattering roller adjustably towards or away from the delivery drum, as indicated by arrow G. The spattering roller is also driven by a motor, via a V-belt drive assembly (again not shown). An overflow sump 69 may be provided at the base of the apparatus to catch excess slurry which falls from the delivery drum, without being removed by the spattering roller.

In use, the apparatus is positioned over the upper run of the felt belt 15 of the Hatschek machine 10, ideally upstream of the size or accumulation roller 18, as previously indicated in the context of FIG. 2. This position conveniently allows for dewatering of the spattered layer simultaneously with the other layers, initially over the main vacuum box 17 and subsequently in the nip between the size roller 18 and the tread roll 19. It should be appreciated, however, that the spattering apparatus may be positioned at any stage in the process, depending upon the composition of the spattered slurry and its intended function in the FRC sheet.

As the partially formed sheet or film passes under the apparatus, slurry flowing from the reservoir migrates onto the rotating delivery drum 44. The spattering roller simultaneously rotates, whereby the bristles 64 are dragged rapidly over the adjacent delivery drum, picking up slurry from the layer clinging to the delivery surface 45 of the drum. When the bristles 64 move clear of the delivery drum, the slurry is flicked or spattered downwardly onto the belt or sheet material 70 passing underneath, thereby uniformly to apply an initial layer or an additional layer or film of slurry to the sheet.

The distance that the counter-rotating metering roller 47 is positioned from the delivery drum determines the cross sectional area of the intermediate space 62 and hence the flow rate of the slurry onto the delivery drum. This in turn determines the thickness of the layer of slurry formed on the delivery surface, which also affects the spattering of the slurry by the spattering roller. This thickness can be adjusted as desired by means of the ram 61, according to the particular formulation of slurry being used and the desired characteristics of the slurry layer to be applied to the sheet.

In addition to adjusting the cross sectional flow area of the clearance space 62, the spattering characteristics can also be varied by moving the spattering roller towards or away from the delivery drum, using the second ram 68. This varies the extent to which the bristles penetrate the slurry layer on the delivery surface, the pressure of the bristles 44 on the delivery surface, and the extent of resilient deformation of the bristles to provide an added dimension of control. Further adjustment and control can be achieved by varying the speed of the spattering roller, both in absolute terms and relative to the delivery roller. By altering these various operational parameters, different thicknesses, up to around 10 mm or more, can be achieved in single, intermediate or surface layers. Different surface finishes such as orange peel, stucco and the like can also be achieved.

The second sub-frame 65 is capable of rotating sufficiently about its axis 67 to allow the spattering roller to move well clear of the delivery drum. As part of the regulation means, this enables accurate stopping and starting of the application process as described in more detail below, as well as facilitating cleaning and maintenance of the spattering roller and the drum.

It will be appreciated that some of the slurry dropping from the reservoir will land on, and be carried around by, the metering roller, rather than landing on the delivery drum. This slurry, as well as other slurry from the reservoir which has not been removed by the spattering roller, will fall from the metering roller as overflow. This overflow slurry is caught in the sump 69, from where it is fed by gravity back to the main tank 50.

It is intended that an embodiment of the apparatus will be used on a production line in which FRC sheets having different characteristics, and different combinations of layers, are produced in rapid succession. Consequently, it is necessary that the apparatus be able to pause and restart the spattering process, as well as permitting adjustment of the slurry flow rate, rapidly and accurately. Otherwise, there will be a carry over of the spattering conditions in respect of one type of sheet to the subsequent type of sheet passing along the production line. To temporarily stop the spattering process, the spattering roller is intermittently moved away from the delivery roller. In this way, the spattering roller also forms part of the slurry flow regulation means. Additionally or alternatively, the metering roller may simply be moved until it abuts the delivery drum directly, so as to completely close the clearance space 62, thereby cutting off the supply of slurry to the deliver surface, through the associated outlet.

It is not desirable, however, to stop or reduce the rate of delivery of slurry from the main tank to the reservoir during this process, as this may have disadvantageous consequences upstream including overflows, variations in slurry consistency or concentration, settling or sedimentation, upsetting of other process parameters, and/or clogging of piping. Accordingly, when the spattering process is paused, resulting in the flow rate of slurry from the reservoir being reduced or stopped, the level of slurry in the reservoir begins to rise. When it reaches the level of the overflow pipe 54, the slurry begins to be recycled back to the main tank, from where it continues to circulate to and from the reservoir until delivery resumes.

Figure 4:
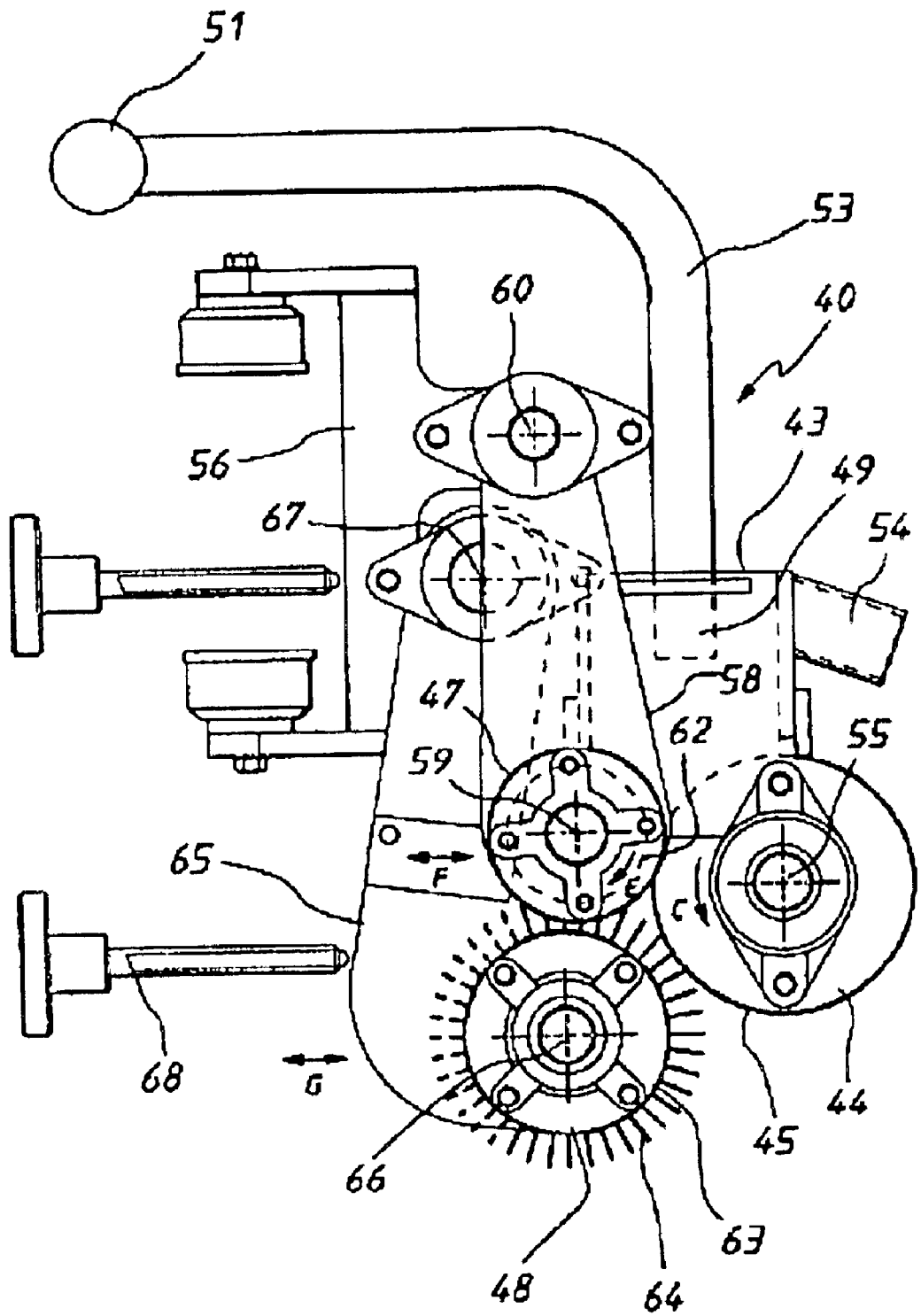
FIG. 4 is a side elevation of the spattering apparatus of FIG. 3.
Figure 5:
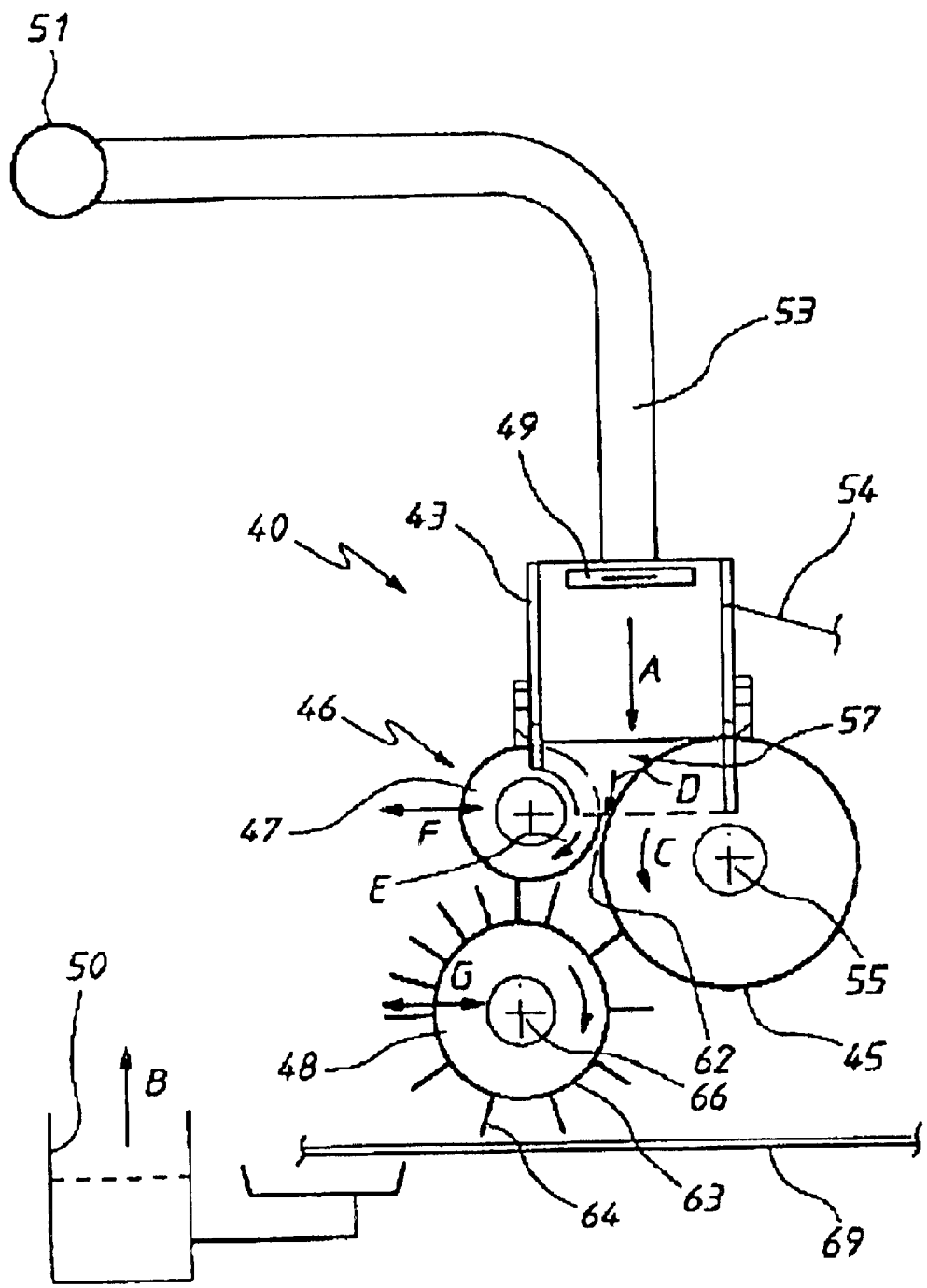
FIG. 5 is a schematic side elevation showing the flow of slurry through the spattering apparatus of FIGS. 3 and 4.
Figure 6:
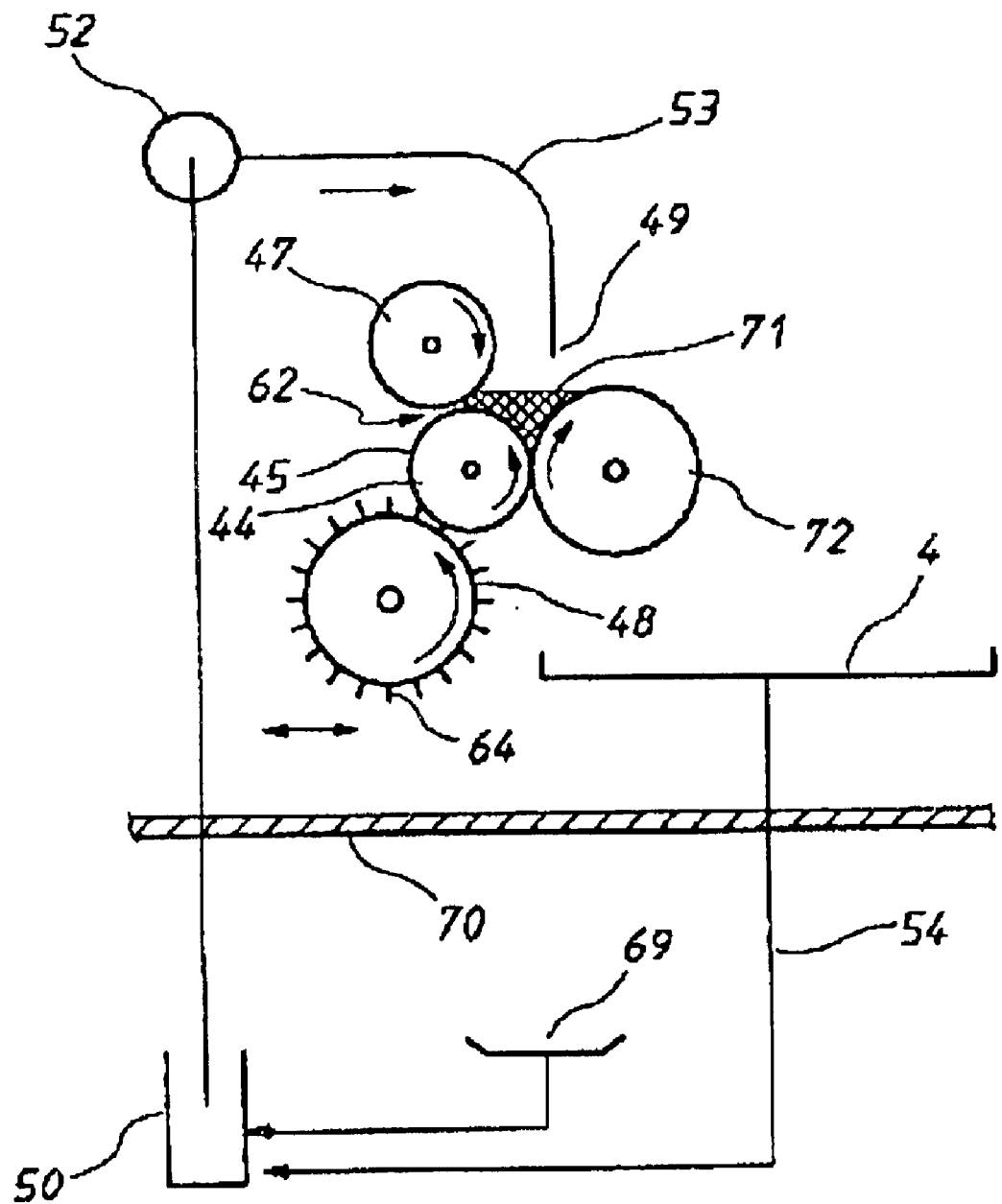
FIG. 6 is a schematic side elevation showing an alternative embodiment of the spattering apparatus according to the invention.

FIG. 4 is a schematic view showing a further embodiment of the invention, wherein corresponding features are denoted by corresponding reference numerals. In this case, a separate tank for the reservoir is not used. Rather, the reservoir simply takes the form of an open topped containment region 71 defined between the delivery roller 44 and an idler roller 72 positioned in rolling contact, and in side by side relationship, with respect to the delivery roller. The idler roller is coated with polyurethane and is not driven. The height and diameter of the idler roller are configured such that the slurry in the containment region 71 flows naturally into the clearance space 62 defined between the delivery roller 44 and the metering roller 47, which in this embodiment is positioned immediately above the delivery roller. An additional collection tray 74 is provided to collect any slurry dripping from the idler roller, and feed it back to the main tank 50 via the overflow conduit 54 for recirculation. In most other respects, this embodiment functions in essentially the same way as that previously described.

The apparatus may be positioned at any desired point along the process line, and may be selectively operated on an intermittent basis and at any desired stage in the process in order to position the spattered layer or layers appropriately. For example, the spattered layer may be initially applied to the belt as the first layer of film, so as to form what will ultimately be an outer layer of the sheet. This might be done, for example, in a case where the outer spattered layer will comprise a softer FRC formulation to facilitate sanding and finishing, a coloured formulation for branding or to obviate the need for painting, or a textured layer to achieve a desired aesthetic effect. The same considerations might apply in the case where the spattered layer is the final layer in which case, again, it will form an outer face of the finished sheet. Alternatively, the spattered slurry may be applied at an intermediate stage to form an internal layer. This may be done, for example, in the case of a fire retardant layer, a moisture barrier layer, or a layer added for structural purposes, where surface finish or aesthetic considerations are not directly relevant. Multiple spattering stations may also be used in series or parallel, at different stages in the process, using either the same or different slurry formulations, in combination with the Hatschek process or independently, in order to achieve desired configurations of sheet material. Indeed, sheeting formed as a single uniform layer, or multiple layers of the same or different composition, may in suitable circumstances be produced entirely by spattering.

It will be appreciated that the invention provides an effective and efficient method and apparatus for producing sheet material from slurry. In its preferred application as a modification to the Hatschek process, it provides a means of accurately producing a laminated sheet material which can be readily tailored and optimised in order to achieve a wide variety of performance criteria and aesthetic characteristics. The apparatus also allows the slurry application characteristics to be easily and quickly altered, providing a considerable degree of flexibility to produce a range of different products, including laminated products, in a high speed production environment with minimum set up time between runs. In all these respects, the invention represents a practical and commercially significant improvement over the prior art.

Although the invention has described with reference to specific examples, it will be appreciated by those skilled in the art that the invention may be embodied in many other forms. In particular, it will be appreciated that the method and apparatus of the present invention may be adapted for use in conjunction with the composite product, additive for dewaterable slurry, and coatings for building products as described in the various priority documents.

What is claimed is:

1. A method for forming a laminated sheet material from a slurry having a liquid component, said method comprising the steps of:

applying the slurry to a substrate in successive layers to form a wet sheet of predetermined thickness;

applying at least one of the layers by spattering;
removing the wet sheet from the substrate; and
drying or curing the wet sheet so as to remove at least a substantial proportion of the liquid component and thereby forming the sheet material.

2. A method according to claim 1, wherein the slurry is a cementitious slurry formed from a mixture including water, cellulose fibre, silica and cement.

3. A method according to claim 1 or claim 2, incorporating the "Hatschek" process, or a derivative thereof, wherein the substrate takes the form of a porous belt, and the method includes the further steps of:
progressively accumulating the film on a size roller downstream of the belt until a predetermined thickness has been achieved; and
cutting and removing the accumulated material from the size roller to form the wet sheet.

4. A method according to claim 3, wherein the porous belt is formed from a felt material, and the film is deposited at least partially on the belt using a series of sieve cylinders in rolling contact with the belt and substantially immersed in vats containing the slurry.

5. A method according to claim 1, wherein the spattered layer is formed from a material that is substantially different in composition to at least one other layer in the sheet, the composition and position of the spattered layer being selected to confer or optimise predetermined physical properties or performance characteristics in the sheet.

6. A method according to claim 5, wherein the desired properties or characteristics include one or more properties or characteristics selected from a group comprising: enhanced water resistance, fire retardance, tensile or compressive strength, toughness, crack resistance, impact resistance, hardness, density, thickness, thermal insulation, acoustic insulation, nailability, workability, colour and surface texture.

7. A method according to claim 1, wherein the spattered slurry is a cementitious slurry formed from a mixture including silica, cement, and water.

8. A method according to claim 1, wherein the slurry is a self levelling dewaterable cementitious slurry with a solids content of between 50% and around 90%.

9. A method according to claim 8, wherein the slurry includes a dewatering aid in sufficient quantity to permit dewatering of the slurry through the substrate.

10. A method according to claim 1, wherein the spattered layer is applied using a spattering apparatus for applying a slurry to a substrate, the apparatus including:
a delivery surface disposed to support a layer of slurry;
spattering means adapted to be positioned closely adjacent the delivery surface and being moveable so as to spatter the slurry from the delivery surface onto the substrate; and
regulation means for selectively varying or interrupting the flow of slurry from the delivery surface onto the substrate.

11. A method according to claim 10, wherein the substrate takes the form of either the porous belt, or a previously deposited layer of the cementitious slurry.

12. A method according to claims 10 or claim 11, wherein the spattering apparatus further includes a reservoir to contain slurry upstream of the regulation means.

13. A method according to claim 12, wherein the reservoir includes an inlet to direct slurry from a supply source and an outlet associated with the regulation means.

14. A method according to claim 13, wherein the regulation means include a pair of barrier elements selectively movable to define an intermediate clearance space of variable effective cross-sectional flow area, thereby to permit selective regulation of the flow rate of slurry from the reservoir, between the barrier elements, through the outlet, to the delivery surface.

15. A method according to claim 14, wherein the barrier elements are selectively adapted, in, a closed configuration, to shut off flow between the reservoir and the delivery surface.

16. A method according to claim 15, wherein one of the barrier elements comprises a first cylindrical roller rotatable about a first axis.

17. A method according to claim 16, wherein another of the barrier elements is a second cylindrical roller rotatable about a second axis, parallel to the first.

18. A method according to claim 17, wherein the first and second rollers are configured to rotate in opposite directions.

19. A method according to claim 18, wherein the first roller takes the form of a delivery drum, an outer surface of which constitutes the delivery surface, and the second roller takes the form of a metering roller selectively movable toward, and away from, the delivery drum.

20. A method according to claim 19, further including a main frame supporting the delivery drum, and a first sub-frame on which the metering roller is mounted, the first sub-frame being rotatable about a third axis parallel to and spaced apart from the second axis, thereby adjustably to displace the metering roller towards, and away from, the delivery drum while maintaining a parallel orientation therebetween.

21. A method according to claim 20, further including first actuation means extending effectively between the main frame and the first sub-frame for adjustably moving the metering roller and the delivery drum toward or away from each other.

22. A method according to claim 21, wherein the first actuation means include a hydraulic or pneumatic cylinder.

23. A method according to claim 10, wherein the spattering means include a plurality of resiliently flexible elongate spattering elements in the form of bristles, extending radially outwardly from a cylindrical body rotatable about a fourth axis.

24. A method according to claim 23, when dependent upon claim 20, wherein the fourth axis is generally parallel to the first, second and third axes.

25. A method according to claim 23 or claim 24, wherein the body and the spattering elements together form a spattering roller.

26. A method according to claim 25, further including a second sub-frame on which the spattering roller is mounted, the second sub-frame being rotatable about a fifth axis substantially parallel to, and spaced apart from, the fourth axis.

27. A method according to claim 26, wherein second actuation means extend effectively between the main frame and the second sub-frame to effect independently adjustable displacement of the spattering roller towards and away from the delivery drum, so as to permit selective variation or interruption of the spattering process, as part of the regulation means.

28. A method according to claim 27, wherein the second actuation means include a hydraulic or pneumatic cylinder.

29. A method according to claim 19, wherein the spattering apparatus further includes a tank for containing a supply of the slurry and a delivery conduit for delivering the slurry from the tank to the reservoir through the inlet.

30. A method according to claim 29, wherein the reservoir is defined by a tank positioned immediately above the delivery drum and the metering roller.

31. A method according to claim 29, wherein the reservoir comprises a containment region defined between adjacent rollers.

32. A method according to claim 31, wherein the containment region is defined between the delivery drum and an abutting idler roller, with the metering roller being positioned above the delivery roller.

33. A method according to claim 10, incorporating a series of said spattering apparatus' disposed to operate on a common Hatschek machine.

34. A method according to claim 33, including the further step of dewatering the slurry through the sheet, using vacuum boxes positioned downstream of one or more of the spattering apparatus'.

35. A method according to claim 33, wherein each of the spattering apparatus' is configurable to deliver a slurry formulation having a composition that is either the same as or different from the composition of the slurry delivered by other spattering apparatus' in the series, with each formulation corresponding to a desired aesthetic, functional or performance characteristic in the sheet.

36. A method according to claim 33, including the further step of controlling each spattering apparatus in the series so as to deliver single or multiple layers between successive fibre cement laminates.

* * * * *